United States Patent
Zhang et al.

(10) Patent No.: US 10,805,385 B2
(45) Date of Patent: Oct. 13, 2020

(54) METHOD AND APPARATUS FOR MANAGING RESOURCE ON CLOUD PLATFORM

(71) Applicant: Huawei Technologies Co., Ltd., Shenzhen (CN)

(72) Inventors: Qi Zhang, Beijing (CN); Jie Niu, Beijing (CN); Jiaqing Wu, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 7 days.

(21) Appl. No.: 16/047,789

(22) Filed: Jul. 27, 2018

(65) Prior Publication Data

US 2018/0337984 A1 Nov. 22, 2018

Related U.S. Application Data

(63) Continuation of application No. PCT/CN2017/071274, filed on Jan. 16, 2017.

(30) Foreign Application Priority Data

Jan. 29, 2016 (CN) .......................... 2016 1 0067172

(51) Int. Cl.
 *H04L 29/08* (2006.01)
 *G06F 9/455* (2018.01)
 (Continued)

(52) U.S. Cl.
 CPC ...... *H04L 67/1031* (2013.01); *G06F 9/45558* (2013.01); *G06F 9/5077* (2013.01);
 (Continued)

(58) Field of Classification Search
 CPC . H04L 67/1031; H04L 67/1034; H04L 67/16; H04L 41/0893; H04L 43/0817; G06F 9/45558; G06F 9/5077
 See application file for complete search history.

(56) References Cited

U.S. PATENT DOCUMENTS 9,015,324 B2 * 4/2015 Jackson ................ G06F 9/5027
 709/226
2014/0101226 A1 * 4/2014 Khandekar ......... H04L 67/1008
 709/203
(Continued)

FOREIGN PATENT DOCUMENTS

CN 102427475 A 4/2012
CN 103425535 A 12/2013
(Continued)

*Primary Examiner* — Azizul Choudhury
(74) *Attorney, Agent, or Firm* — Leydig, Voit & Mayer, Ltd.

(57) ABSTRACT

A method and an apparatus for managing a resource on a cloud platform is disclosed. The method includes: determining a resource adjustment policy according to first status information of the cloud platform, determining a size of an intelligent sliding window (ISW) according to second status information of the cloud platform, where the ISW is used to indicate an allowed maximum page view PV of the application in a unit time; and adjusting, according to the resource adjustment policy, the quantity of resources allocated to the application, and adjusting the ISW according to the determined size of the ISW.

18 Claims, 7 Drawing Sheets

```
┌──────────────────────────────────────────────────────────┐
│  Determine a resource adjustment policy according to     │    S410
│  first status information of a cloud platform, where the │
│  resource adjustment policy is used to adjust a quantity │
│  of resources allocated to an application                │
└──────────────────────────────────────────────────────────┘
                            │
┌──────────────────────────────────────────────────────────┐
│  Determine a size of an intelligent sliding window ISW   │
│  according to second status information of the cloud     │    S420
│  platform, where the ISW is used to indicate an allowed  │
│  maximum page view PV of the application in a unit time, │
│  and the first status information and the second status  │
│  information indicate running statuses of the cloud      │
│  platform when the cloud platform provides a service     │
│  for the application                                     │
└──────────────────────────────────────────────────────────┘
                            │
┌──────────────────────────────────────────────────────────┐
│  Adjust, according to the resource adjustment policy,    │    S430
│  the quantity of resources allocated to the application, │
│  and adjust the ISW according to the determined size     │
│  of the ISW                                              │
└──────────────────────────────────────────────────────────┘
```

(51) Int. Cl.
*G06F 9/50* (2006.01)
*H04L 12/24* (2006.01)
*H04L 12/26* (2006.01)

(52) U.S. Cl.
CPC .......... *H04L 29/08* (2013.01); *H04L 41/0893* (2013.01); *H04L 43/0817* (2013.01); *H04L 67/1034* (2013.01); *H04L 67/16* (2013.01); *G06F 2009/45591* (2013.01); *G06F 2009/45595* (2013.01)

(56) References Cited

U.S. PATENT DOCUMENTS

| | | | | |
|---|---|---|---|---|
| 2015/0039764 | A1* | 2/2015 | Beloglazov | H04L 47/70 709/226 |
| 2015/0278837 | A1* | 10/2015 | Lahav | G06Q 30/0204 705/7.33 |
| 2015/0341230 | A1* | 11/2015 | Dave | H04L 41/5058 705/7.29 |

FOREIGN PATENT DOCUMENTS

| | | |
|---|---|---|
| CN | 103780646 A | 5/2014 |
| CN | 104168133 A | 11/2014 |
| CN | 105208111 A | 12/2015 |

\* cited by examiner

METHOD AND APPARATUS FOR MANAGING RESOURCE ON CLOUD PLATFORM

CROSS-REFERENCE TO RELATED APPLICATIONS

This application is a continuation of International Application No. PCT/CN2017/071274, filed on Jan. 16, 2017, which claims priority to Chinese Patent Application No. 201610067172.X, filed on Jan. 29, 2016. The disclosures of the aforementioned applications are hereby incorporated by reference in their entireties.

TECHNICAL FIELD

Embodiments of this application relate to the field of information technologies, and more specifically, to a method and an apparatus for managing a resource on a cloud platform.

BACKGROUND

In a cloud computing era, a large quantity of applications are hosted on a cloud platform. The cloud platform not only has to ensure high availability of itself, but also has to ensure high availability of applications hosted on it. A user access count of an application (App) may surge, for example, when a promotion and publicity activity of the App is initiated by a social platform, and the App is promoted to 500,000 users at a time, a concurrent user access count surges from 2000/s to 50,000/s within one minute after publicity activity information is sent. Alternatively, when the App is unexpectedly recommended by a celebrity on a social platform, a user access count may surge without any sign, and a concurrent access count may surge from 2000/s to 100,000/s within one day.

For an access count surge, the conventional art has two solutions to keep an application stable and available: One is to use a load balance (LB) system. For example, a service performance upper limit of an App is set. When a page view (PV) reaches this upper limit, only requests within a scope of the upper limit are processed, and for requests beyond the scope, a waiting service or a rejection-like service is performed. When the load balance system is used to deal with the access count surge, the application is unable to satisfy access requirements of all users, that is, the application is unavailable for some users. Another solution of the conventional art is to use a flexible scaling system to monitor information of the App, such as a running status. When an access count of the application increases, dynamic capacity expansion is performed. For example, a quantity of virtual machines (VM) or servers that provide an App service is increased according to an access count increment of the application. However, when the access count surges, a speed of capacity expansion is usually slower than a speed of a concurrent access count increase. Therefore, before capacity expansion is completed, a virtual machine or a server may have crashed, and a newly added virtual machine or server is under great access pressure immediately and fails to function. Therefore, when a user access count surges, both the two solutions are unable to provide a stable high-availability service for a user.

SUMMARY

Embodiments of this application provide a method and an apparatus for managing a resource on a cloud platform. Therefore, when it is ensured that an existing service is stable and available, rapid and efficient dynamic capacity expansion is implemented to deal with a case in which an access count of an application increases in a short time.

According to a first aspect, an embodiment of this application provides a method for managing a resource on a cloud platform, where the cloud platform is used to provide a resource required for running an application deployed on the cloud platform, and the method includes: determining a resource adjustment policy according to first status information of the cloud platform, where the resource adjustment policy is used to adjust a quantity of resources allocated to the application; determining a size of an intelligent sliding window ISW according to second status information of the cloud platform, where the ISW is used to indicate an allowed maximum page view PV of the application in a unit time, and the first status information and the second status information indicate running statuses of the cloud platform when the cloud platform provides a service for the application; and adjusting, according to the resource adjustment policy, the quantity of resources allocated to the application, and adjusting the ISW according to the determined size of the ISW.

An execution body of this embodiment of this application is an apparatus for managing a resource on a cloud platform. The apparatus may be an independent apparatus, may be integrated into an LB system or a flexible scaling system of the cloud platform, or the like. In the first aspect, the apparatus for managing a resource adjusts, according to status information of the cloud platform, a quantity of resources allocated to an application and a size of an intelligent sliding window. When an access count of the application surges, by dynamically adjusting the size of the ISW, it is ensured to provide a stable high-availability service for the application, and gradual capacity expansion is implemented rhythmically as required by dynamically adjusting the quantity of resources allocated to the application.

With reference to the first aspect, in a first implementation of the first aspect, the determining a resource adjustment policy according to first status information of the cloud platform includes: determining a health condition of the cloud platform according to the first status information, where the health condition of the cloud platform indicates a performance status of the cloud platform when the cloud platform provides a service for the application. In this implementation, the apparatus for managing a resource on a cloud platform may determine the health condition of the cloud platform according to running status information of the cloud platform, and determine a resource adjustment policy for the health condition according to the health condition of the cloud platform, so as to adjust, according to the resource adjustment policy, the quantity of resources allocated to the application.

With reference to the first aspect and the foregoing implementation, in a second implementation of the first aspect, the determining the resource adjustment policy according to the health condition of the cloud platform includes: determining a health condition level corresponding to the health condition of the cloud platform from multiple health condition levels; and determining a resource adjustment policy corresponding to the health condition level according to a correspondence between multiple resource adjustment policies and the multiple health condition levels that is preconfigured on the cloud platform. In this implementation, the apparatus for managing a resource on a cloud platform may preconfigure different resource adjustment policies for different health condition levels. After obtaining the health condition of the cloud platform, the apparatus may use, according to a health condition level corresponding to the health condition, a corresponding resource adjustment policy to adjust the quantity of resources allocated to the application. Therefore, different resource adjustment policies can be used according to different health conditions, so that a proper resource quantity can be configured according to the health condition of the cloud platform, and resource utilization on the cloud platform is improved.

With reference to the first aspect and the foregoing implementations, in a third implementation of the first aspect, the method further includes: determining that a current running status of the cloud platform is an emergency state according to a PV fluctuation ratio of the application and/or a quantity of remaining resources of the cloud platform; determining an emergency plan that matches the current running status of the cloud platform from a plan library of the cloud platform; and adjusting, according to a solution of the emergency plan, the quantity of resources allocated to the application and the ISW. In this implementation, when determining that the cloud platform is in an emergency state according to the fluctuation ratio of the application and/or the quantity of remaining resources of the cloud platform, the apparatus for managing a resource on a cloud platform may quickly match an emergency plan in the plan library, and then may quickly adjust, according to a solution of the emergency plan, the quantity of resources allocated to the application and the size of the ISW. Therefore, a decision-making speed for an emergency is increased by using a method for matching an emergency plan to obtain a solution, so that a response can be made in time when an access count surges.

With reference to the first aspect and the foregoing implementations, in a fourth implementation of the first aspect, the determining an emergency plan that matches the current running status of the cloud platform from a plan library of the cloud platform includes: determining, according to at least one of a PV of the application, a service type of the application, the quantity of remaining resources of the cloud platform, or a response time of the application, that the current running status of the cloud platform matches the emergency plan.

With reference to the first aspect and the foregoing implementations, in a fifth implementation of the first aspect, the determining the resource adjustment policy according to the health condition of the cloud platform includes: if the health condition of the cloud platform is less than a first health condition threshold and greater than a second health condition threshold, determining that the health condition of the cloud platform belongs to a first health condition level, where a resource adjustment policy corresponding to the first health condition level is to adjust the size of the intelligent sliding window ISW according to the health condition of the cloud platform; or if the health condition of the cloud platform is less than a second health condition threshold and greater than a third health condition threshold, determining that the health condition of the cloud platform belongs to a second health condition level, where a resource adjustment policy corresponding to the second health condition level is to make a resource adjustment suggestion according to the health condition of the cloud platform and send the resource adjustment suggestion to a flexible scaling system, so that the flexible scaling system adjusts, according to the resource adjustment suggestion, the quantity of resources allocated to the application; or if the health condition of the cloud platform is less than a third health condition threshold, determining that the health condition of the cloud platform belongs to a third health condition level, where a resource adjustment policy corresponding to the third health condition level is to determine a plan that matches the health condition of the cloud platform from the plan library of the cloud platform, and adjust, according to a solution used to deal with the plan, the quantity of resources allocated to the application, where the second health condition threshold is less than the first health condition threshold, and the third health condition threshold is less than the second health condition threshold. In this implementation, the apparatus for managing a resource on a cloud platform may develop a correspondence between different health conditions and different health condition levels, so as to determine a corresponding health condition level according to the health condition after health condition information is obtained, and further determine a resource adjustment policy corresponding to the health condition level.

With reference to the first aspect and the foregoing implementations, in a sixth implementation of the first aspect, the first status information of the cloud platform includes at least one of the following items: the PV fluctuation ratio of the application, the quantity of remaining resources of the cloud platform, an average response time of the application, or a service health coefficient $\beta$ of the application, where $\beta$ is a performance indicator of the cloud platform that is fed back by the flexible scaling system; and the second status information of the cloud platform includes at least one of the following items: the allowed maximum PV of the application in a unit time, the quantity of remaining resources of the cloud platform, or a period of time from a moment when a server that provides a service for the application is started to a moment when the server is loaded to provide a service.

According to a second aspect, an apparatus for managing a resource on a cloud platform is provided, where the apparatus includes modules configured to execute the method in the first aspect or any implementation of the first aspect.

According to a third aspect, an apparatus for managing a resource on a cloud platform is provided, where the apparatus includes a transceiver component, a software component, and a hardware component.

In this embodiment of this application, the method in the first aspect or any implementation of the first aspect is implemented by using the software component and/or the hardware component.

According to a fourth aspect, an apparatus for managing a resource on a cloud platform is provided, where the apparatus includes an input device, an output device, a processor, a memory, and a bus system. The input device, the output device, the processor, and the memory are connected by using the bus system. The processor executes an instruction stored in the memory by invoking an operation instruction stored in the memory, and execution of the operation instruction stored in the memory enables the processor to execute the method in the first aspect or any implementation of the first aspect.

Based on the foregoing technical solutions, according to the method and the apparatus for managing a resource on a cloud platform in the embodiments of this application, a quantity of resources allocated to an application and a size of an intelligent sliding window can be adjusted according to status information of the cloud platform. Therefore, when a user access count surges, a stable high-availability service can be provided by adjusting the quantity of resources allocated to the application the size of the ISW.

DESCRIPTION OF EMBODIMENTS

Figure 1:
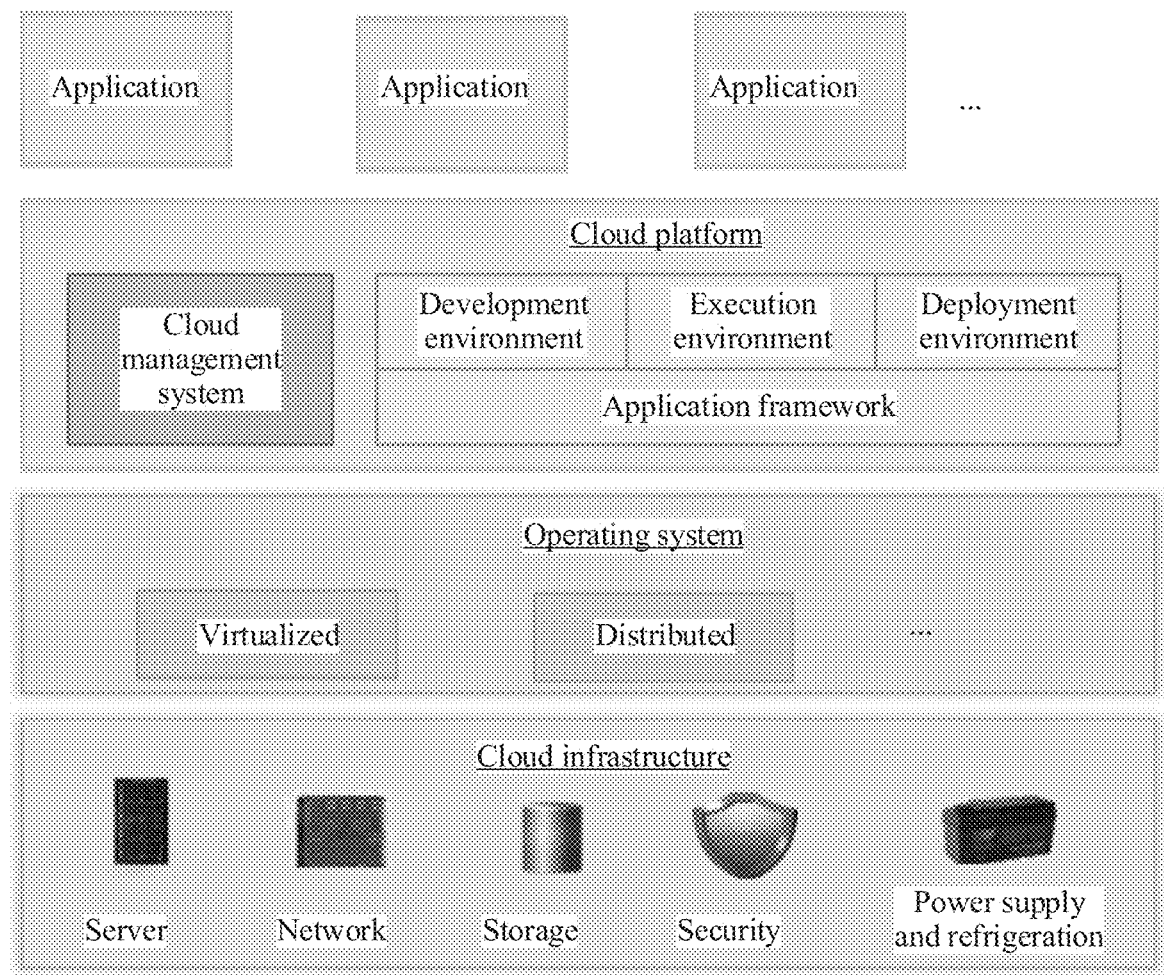
FIG. 1 is a schematic diagram of a cloud computing system to which an embodiment of this application is applicable.

A method according to embodiments of this application may be typically applied to a cloud computing system shown in FIG. 1. As shown in FIG. 1, the cloud computing system includes: a cloud infrastructure and an operating system running on the cloud infrastructure. The cloud infrastructure may include hardware resources provided by multiple physical machines (such as servers), such as a central processing unit (CPU), a memory, a hard disk, and a network bandwidth, and may further include a resource for an aspect such as security, power supply, or refrigeration. The operating system in the cloud computing system is usually referred to as a cloud operating system, used to implement functions, such as abstraction, management, and scheduling of a hardware resource. An application is deployed on a cloud platform after the application is developed by a developer. As a bridge between the application and an underlying operating system, the cloud platform can provide the application with system resources required for running, such as a deployment environment, an execution environment, a computing resource, and a storage resource. Further, a cloud management system on the cloud platform may dynamically adjust, by using a load balance system and/or a flexible scaling system, a quantity of resources allocated to the application. For example, when an access count of an application increases, more system resources may be allocated to the application.

Figure 2:
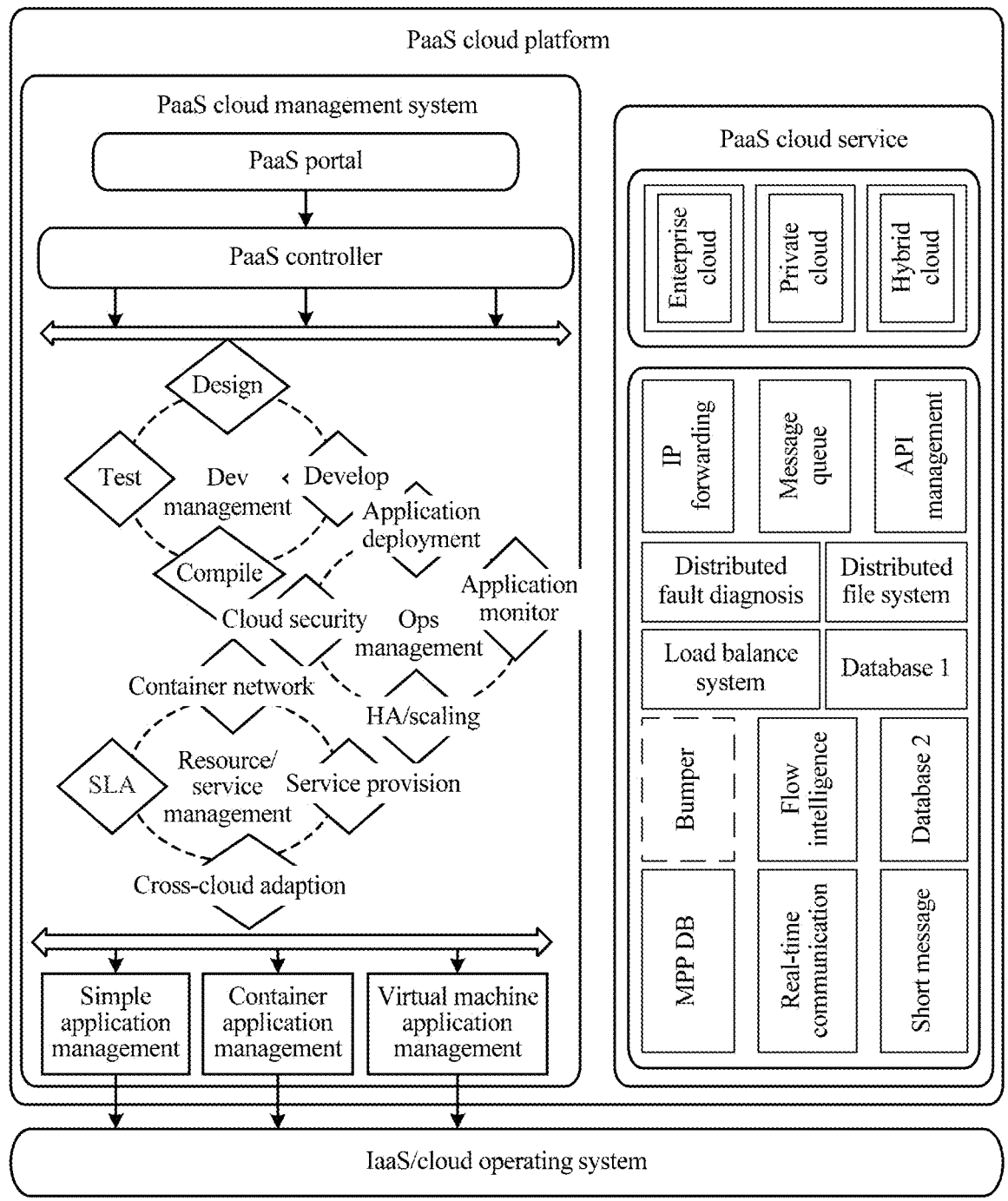
FIG. 2 is a schematic diagram of a PaaS platform to which an embodiment of this application is applicable.

The cloud platform in the cloud computing system may be provided for a user or a developer as a service, and this mode is usually referred to as a platform-as-a-service (PaaS). Therefore, the cloud platform in the cloud computing system is usually referred to as a PaaS cloud platform or a PaaS platform. FIG. 2 is a schematic diagram of a PaaS platform according to an embodiment of this application. In terms of division according to a cloud computing logical structure, the PaaS platform is at an intermediate layer of the cloud computing system, and an upper layer of the PaaS platform is software-as-a-service (SaaS). SaaS is responsible for maintaining and managing software and hardware facilities of the cloud platform, and is free of charge or charges a user in a pay-on-demand manner. A lower layer of the PaaS platform is infrastructure-as-a-service (IaaS), used to provide infrastructure services, such as virtual computing, storage, and a database. A user may obtain required resources, such as a computing resource or a storage resource from a provider to load a related application, and pay for merely the resource that the user rents.

An execution body of the embodiments of this application is an apparatus for managing a resource on the cloud platform. There may be multiple apparatuses for managing a resource on the cloud platform, and the apparatuses are used to manage applications of different categories and different service types on the cloud platform. Optionally, each apparatus for managing a resource may be an independent apparatus, or may be integrated into an LB system on the cloud platform, or further integrated into a flexible scaling system, and this is not limited in the embodiments of this application. For example, the apparatus for managing a resource may be a bumper in FIG. 2, may be an independent module on the PaaS platform, or may be integrated into the LB system of the PaaS platform. Alternatively, the bumper may be integrated into the flexible scaling system (that is, an HA/scaling in FIG. 2) of the PaaS platform. Alternatively, a method for managing a resource on a cloud platform according to the embodiments of this application may be completed by means of combining the bumper and the flexible scaling system. The embodiments of this application set no limitation thereto.

It should be understood that, the execution body of the embodiments of this application, that is, the apparatus for managing a resource, may be referred to as the bumper shown in FIG. 2, and certainly may have another name. The embodiments of this application set no limitation on the name of the execution body. The bumper may be an independent apparatus, a flexible scaling system, or an LB system, or may be integrated into the flexible scaling system or the LB system, or the like. This is not limited in the embodiments of this application. For brevity, the embodiments of this application are described based on that the execution body is the bumper.

Figure 3:
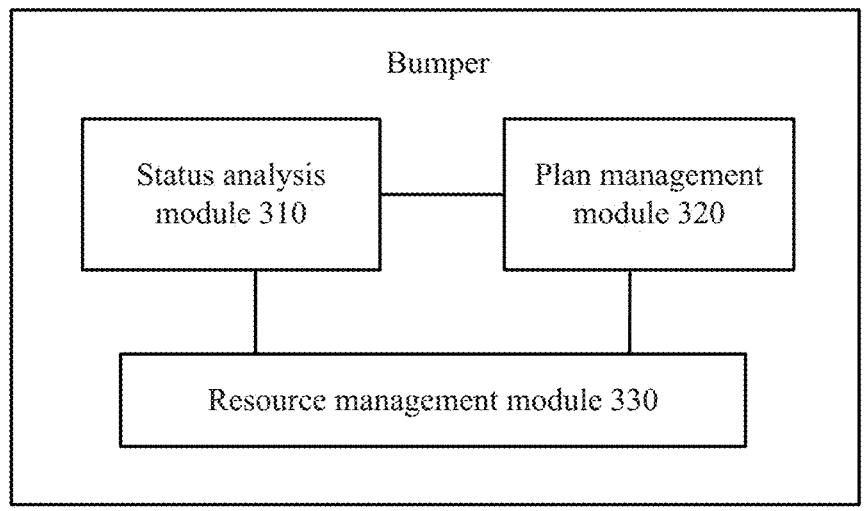
FIG. 3 is a schematic diagram of an apparatus for managing a resource on a cloud platform according to an embodiment of this application.

As shown in FIG. 3, the bumper may include a status analysis module 310, a plan management module 320, and a resource management module 330. The status analysis module 310 is configured to analyze and predict a running status of the cloud platform, and determine a health condition of the cloud platform and a size of an intelligent sliding window (ISW) (the size of the ISW is an allowed maximum page view of an application in a unit time). Therefore, the resource management module 330 adjusts, according to the determined size of the intelligent sliding window, the ISW to reduce impact caused by an access request surge, or makes a resource adjustment solution according to the health condition of the cloud platform, for example, increases a quantity of resources allocated to the application by enabling a virtual machine. The quantity of resources allocated to the application is a quantity of resources (such as a CPU or a Memory) that the cloud platform allocates to the application to provide a service. The plan management module 320 is configured to manage a historical plan. Because applications on the cloud platform have different types and various service types, the plan management module 320 may extract various types of valid historical plans to build a plan library for different services, thereby making it convenient to provide a solution for a subsequent case. For example, if an emergency happens on the cloud platform, a plan similar to the current emergency may be quickly matched in the plan library. For example, a factor such as a quantity of access requests to the App or a response time of the App may be used to match the plan similar to the current emergency. Then, the ISW may be adjusted or a VM may be added according to a solution of the matched plan. The resource management module 330 may be configured to adjust, according to the solution of the matched plan, the ISW or the quantity of resources allocated to the application, or determine a corresponding resource adjustment suggestion according to the health condition of the cloud platform, and then adjust, according to the resource adjustment suggestion, the quantity of resources allocated to the application, or adjust the ISW according to the size of the ISW that is determined by the status analysis module 310. For example, the status analysis module 310 may determine the health condition of the cloud platform and the size of the ISW according to one or more of a PV, the response time (RT), historical health condition data, or historical intelligent sliding window data of the App. The status analysis module 310 may further push the determined health condition data and ISW data to the plan management module 320. The plan management module 320 may perform matching on a historical plan in the plan library of the cloud platform according to the health condition data and the ISW data, to determine a solution to the health condition data and the ISW data. Optionally, the plan management module 320 may further push the solution to the resource management module 330, so that the resource management module 330 adjusts, according to the solution, the ISW or the quantity of resources allocated to the application. The status analysis module 310 may further push the determined health condition data and the ISW data to the resource management module 330, so that the resource management module 330 may make a corresponding solution according to the health condition data and the ISW data. Optionally, the resource management module 330 may further push the made solution to the plan management module 320, where the solution is used as a reference plan when a subsequent system plan is made. Optionally, the resource management module 330 may further push the made solution to a flexible scaling system, so that the flexible scaling system adjusts, according to the solution, the ISW or the quantity of resources allocated to the application. Optionally, the status analysis module 310 may further push the determined health condition data and the ISW data to the flexible scaling system, so that the flexible scaling system makes a corresponding resource adjustment policy according to the health condition data and the ISW data, and adjusts, according to the resource adjustment policy, the ISW and the quantity of resources allocated to the application.

It should be understood that, adjusting, by the bumper, the quantity of resources allocated to the application mainly includes two aspects: increasing the quantity of resources allocated to the application ("capacity expansion" for short), for example, increasing a quantity of virtual machine servers that provide a service for the App; or reducing the quantity of resources allocated to the application ("capacity reduction" for short), for example, reducing a quantity of VMs that provide a service for the App.

Figure 4:
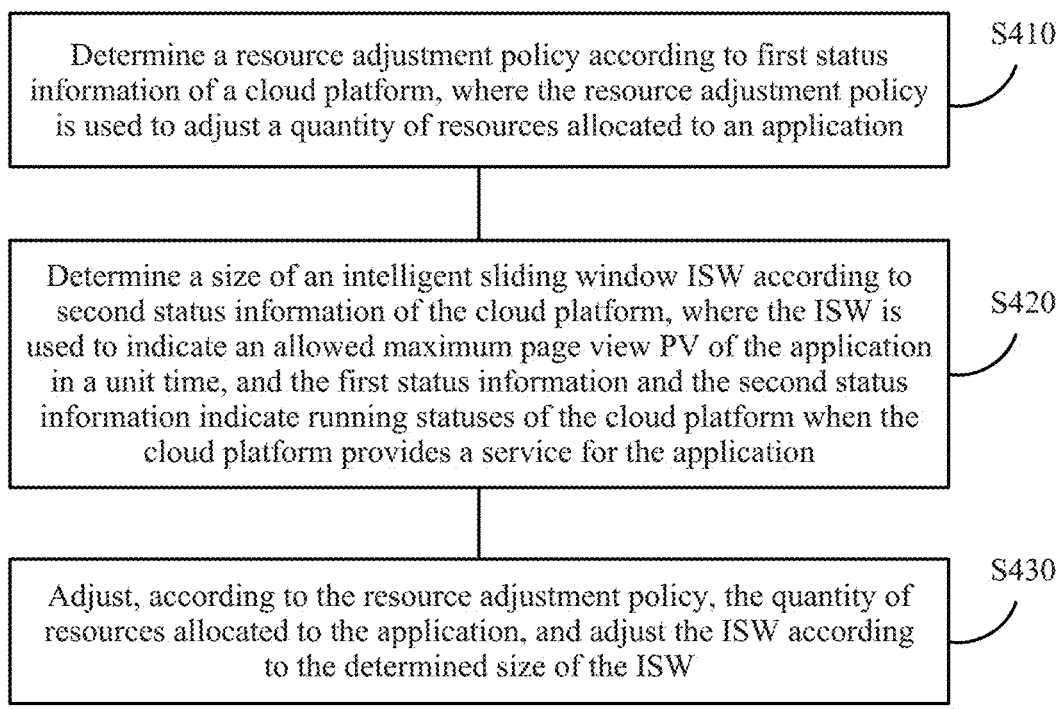
FIG. 4 is a schematic flowchart of a method for managing a resource on a cloud platform according to an embodiment of this application.

FIG. 4 shows a schematic flowchart of a method 400 for managing a resource on a cloud platform according to an embodiment of this application. As shown in FIG. 4, the method 400 includes:

S410. Determine a resource adjustment policy according to first status information of the cloud platform, where the resource adjustment policy is used to adjust a quantity of resources allocated to an application.

S420. Determine a size of an intelligent sliding window ISW according to second status information of the cloud platform, where the ISW is used to indicate an allowed maximum page view PV of the application in a unit time, and the first status information and the second status information indicate running statuses of the cloud platform when the cloud platform provides a service for the application.

S430. Adjust, according to the resource adjustment policy, the quantity of resources allocated to the application, and adjust the ISW according to the determined size of the ISW.

Specifically, an execution body of the method 400 may be the bumper in FIG. 3, a flexible scaling system, or may be completed by combining the bumper and the flexible scaling system, and this is not limited in this embodiment of this application. First, the bumper determines a resource adjustment policy according to first status information provided by the cloud platform, where the resource adjustment policy is used to adjust a quantity of resources allocated to the application. The bumper may further determine a size of an ISW according to second status information of the cloud platform, and adjust an allowed maximum page view of the application in a unit time by adjusting the size of the ISW. Both the first status information and the second status information indicate a running status of the cloud platform when the cloud platform provides a service for the application. The first status information and the second status information may be same information or different information, and this is not limited in this embodiment of this application. Optionally, the first status information of the cloud platform may include at least one of the following items: a PV fluctuation ratio of the application, a quantity of remaining resources of the cloud platform, an average response time of the application, or a service health coefficient $\beta$ of the application, where $\beta$ is a performance indicator of the cloud platform that is fed back by a flexible scaling system. The second status information of the cloud platform includes at least one of the following items: the allowed maximum PV of the application in a unit time, the quantity of remaining resources of the cloud platform, or a period of time from a moment when a server that provides a service for the application is started to a moment when the server is loaded to provide a service.

For example, the bumper may predict, according to a PV fluctuation ratio of the application in a current period of time, that a user access count tends to continuously increase in a future period of time. If the application continues to run, system performance may become worse. In this case, the bumper determines, according to the fluctuation ratio, the quantity of resources allocated to the application and the size of the ISW. Optionally, when the PV fluctuation ratio is 40%, the bumper may determine to add one VM and adjust the size of the intelligent sliding window to 80% of the original size; or when the PV fluctuation ratio is 80%, determine to add four VMs and adjust the size of the intelligent sliding window to 40% of the original size.

Therefore, according to the method for managing a resource on a cloud platform in this embodiment of this application, a quantity of resources allocated to an application and a size of an intelligent sliding window can be adjusted according to status information of the cloud platform. Therefore, when a user access count surges, it can be ensured that a stable high-availability service can be provided by adjusting the size of the ISW while capacity expansion is implemented.

Optionally, in an embodiment, the determining a resource adjustment policy according to first status information of the cloud platform includes:

determining a health condition of the cloud platform according to the first status information, where the health condition of the cloud platform indicates a performance status of the cloud platform when the cloud platform provides a service for the application; and determining the resource adjustment policy according to the health condition of the cloud platform.

Specifically, the bumper may first determine the health condition of the cloud platform according to the first status information of the cloud platform, and then determine the resource adjustment policy for the health condition of the cloud platform according to the health condition of the cloud platform, so as to adjust, according to the resource adjustment policy, a quantity of resources allocated to an application. Optionally, the first status information of the cloud platform may include at least one of the following items: a PV fluctuation ratio of the application, a quantity of remaining resources of the cloud platform, an average response time of the application, or a service health coefficient β of the application, where β is a performance indicator of the cloud platform that is fed back by a flexible scaling system. The health condition of the cloud platform may be determined according to the first status information, and therefore, the health condition may be determined according to one or more of the foregoing status information. For example, it may be set that a larger quantity of remaining resources of the cloud platform indicates a higher health condition of the cloud platform; a larger positive PV fluctuation ratio indicates a lower health condition of the cloud platform; or a longer response time of the App indicates a lower health condition of the cloud platform.

Optionally, the health condition of the cloud platform may be represented by a score. For example, the health condition of the cloud platform may be represented by a score from 0-100. It may be set as follows: 100 indicates that the cloud platform operates in an optimum state, and a higher score indicates a better running status of the cloud platform. Alternatively, it may be set as follows: 0 indicates that the cloud platform operates in an optimum state, and a higher score indicates a worse running status of the cloud platform. This is not limited in this embodiment of this application.

Optionally, the health condition of the cloud platform may be represented by a health condition level. For example, it may be set that the health condition of the cloud platform may be divided into four health condition levels: healthy, sub-healthy, slightly-risky, and highly-risky. The healthy level indicates that the cloud platform operates in a good state and can provide a high performance service. The sub-healthy level indicates that although the cloud platform can provide a high performance service in a period of time, if a user access count surges, performance of a cloud platform may deteriorate. That is, in this case, the performance of the cloud platform system tends to be worse. When the cloud platform system is at the highly-risky level, it indicates that the running status of the cloud platform system is poor, and an emergency measure needs to be taken, for example, the quantity of resources allocated to the application needs to be increased.

Optionally, when the health condition of the cloud platform satisfies a preset condition, the bumper may adjust the quantity of resources allocated to the application. For example, if the health condition of the cloud platform is represented by a score (0-100), and a higher score indicates better system performance, that the health condition of the cloud platform satisfies the preset condition means that the health condition of the cloud platform is lower than a threshold. For example, the threshold may be 70. Alternatively, if the health condition of the cloud platform is represented by the foregoing four health condition levels, that the health condition of the cloud platform satisfies the preset condition means that the health condition of the cloud platform is lower than a health condition level. That the health condition of the cloud platform satisfies the preset condition means that the running status of the cloud platform system tends to be worse, and if a user access count surges, system performance may deteriorate. Optionally, the bumper may adjust, according to the second status information of the cloud platform, the size of the ISW to relieve impact caused by an access request surge. For example, if a current health condition of the cloud platform is slightly lower than a first threshold, that is, the running status of the system is not extremely poor, but the system cannot support a user access count surge, the bumper may select to adjust the size of the ISW to relieve the impact caused by the user access request surge. For example, the size of the ISW may be adjusted from 15,000/s to 10,000/s, so that an allowed user access count of the application in a unit time is reduced, thereby reducing system loads.

The foregoing solutions are usually applicable to a case in which a user access count does not continuously increase. If the user access count tends to continuously increase, optionally, the bumper may select to add one or more VMs according to a fluctuation ratio of the user access count in a future period of time, to ensure that the cloud platform system continuously provides a stable and high-performance service. If a current health condition of the cloud platform indicates that a current running status of the cloud platform system is extremely poor, and if the quantity of resources allocated to the application is not increased quickly, access to the application may have a risk of crash. Optionally, the bumper may obtain, by means of matching, an emergency plan that is in the plan library and matches the current running status of the cloud platform, and then adjust, according to a solution of the emergency plan, the quantity of resources allocated to the application and the size of the ISW. For example, if a solution in a system plan is to add four VMs, the bumper may add four VMs rhythmically according to the solution; or the bumper may send the solution to the flexible scaling system, and then the flexible scaling system may emergently add four VMs according to the solution; or the bumper itself may make a resource adjustment policy according to the current running status of the cloud platform, so as to adjust, according to the resource adjustment policy, the quantity of resources allocated to the application and the size of the ISW; or the bumper may further store the made resource adjustment policy in the plan library, so as to provide a learning reference for a subsequent case.

Therefore, according to the method for managing a resource on a cloud platform in this embodiment of this application, a quantity of resources allocated to an application and a size of an intelligent sliding window can be adjusted according to running status information of a cloud platform system. Therefore, when a user access count surges, it can be ensured that a stable high-availability service can be provided by adjusting the size of the ISW while capacity expansion is implemented.

It should be understood that, the foregoing examples are merely examples and set no limitation. The resource adjustment policy determined by the bumper may vary with an actual application scenario of the application, a service type, or a user requirement. A resource adjustment policy in a specific scenario is not limited in this embodiment of this application.

Optionally, as an embodiment, the second status information of the cloud platform includes at least one of the following items:

the allowed maximum PV of the application in a unit time, the quantity of remaining resources of the cloud platform, or a period of time from a moment when a server that provides a service for the application is started to a moment when the server is loaded to provide a service.

Specifically, the bumper may determine the size of the ISW according to the second status information of the cloud platform system, and the bumper may determine the size of the ISW according to one or more of the foregoing information. For example, the size of the ISW may be determined according to the quantity of remaining resources of the cloud platform and the period of time from a moment when a server that provides a service for the application is started to a moment when the server is loaded to provide a service. Optionally, the size of the ISW may be determined according to the following formula:

$$ISW=Min(Size, (C_{total}-C_{Used})/T_{run})$$

where Size is an allowed maximum PV of the application in a unit time, $C_{total}$ represents a total quantity of resources of the cloud platform, $C_{Used}$ represents a quantity of used resources, $C_{total}-C_{Used}$ represents a quantity of remaining resources, $T_{run}$ is a period of time from a moment when a server is started to a moment when the server is loaded to provide a service, $(C_{total}-C_{Used})/T_{run}$ represents a user access count that the quantity of remaining resources can support, and Min indicates that a minimum value is to be obtained.

That is, the ISW may be determined according to the allowed maximum PV of the application in a unit time, that is, Size, and the user access count $(C_{total}-C_{Used})/T_{run}$ that the quantity of remaining resources can support. If Size is greater than $(C_{total}-C_{Used})/T_{run}$, a value of the ISW is $(C_{total}-C_{Used})/T_{run}$; otherwise, the value of the ISW is Size.

Optionally, in an embodiment, the determining the resource adjustment policy according to the health condition of the cloud platform includes:

determining a health condition level corresponding to the health condition of the cloud platform from multiple health condition levels; and determining a resource adjustment policy corresponding to the health condition level according to a correspondence between multiple resource adjustment policies and the multiple health condition levels that is preconfigured on the cloud platform.

Specifically, the bumper may determine a resource adjustment policy for the health condition according to the health condition of the cloud platform, and then adjust, according to the resource adjustment policy, the quantity of resources allocated to the application. For example, when the health condition of the cloud platform is A, it may be determined that a quantity of to-be-added resources is M. When the health condition of the cloud platform is B, it may be determined that a quantity of to-be-added resources is N. If performance of the system in health condition A is better than that in health condition B, it may be set that N>M, that is, more resources need to be added to relieve access pressure of the App in health condition B. Optionally, there may be multiple health condition levels corresponding to the health condition of the cloud platform. A different resource adjustment policy may be configured for each health condition level, so that after obtaining the health condition of the cloud platform, an apparatus for managing a resource can determine a health condition level corresponding to the health condition according to the health condition of the cloud platform, and then determine a resource adjustment policy corresponding to the health condition level. For example, if the health condition of the cloud platform is divided into four health condition levels: healthy, sub-healthy, slightly-risky, and highly-risky, four different resource adjustment policies may be respectively configured for the four health condition levels. Optionally, the four health condition levels may further respectively correspond to four score sections (0-100 are used as an example) of the health condition of the cloud platform. For example, a correspondence among a health condition level, a health condition score, and a resource adjustment policy may be shown in Table 1. $M_1$, $M_2$, and $M_3$ are integers greater than 0, and $M_1<M_2<M_3$. Values of $M_1$, $M_2$, and $M_3$ may be determined according to a specific application scenario, and this is not limited in this embodiment of this application. Data in Table 1 is just an example and sets no limitation. For example, if the determined health condition of the cloud platform is 70, a health condition level corresponding to the current health condition of the cloud platform is the sub-healthy level with reference to a correspondence between a health condition level and a health condition score in Table 1. Then, the bumper may determine a resource adjustment policy corresponding to the health condition level according to the health condition level, and may determine, by checking a correspondence between a health condition level and a resource adjustment policy in Table 1, that the resource adjustment policy corresponding to the sub-healthy level is to add $M_1$ VMs. After determining the corresponding resource adjustment policy, the bumper may adjust, according to the resource adjustment policy, the quantity of resources allocated to the application. For example, if the resource adjustment policy is to add $M_1$ VMs, the bumper may make an adjustment and enable $M_1$ VMs to provide a service for the application. Optionally, after each VM joins service providing, the bumper may determine the health condition of the cloud platform again so as to determine a resource adjustment policy for latest health condition data according to a real-time change of the health condition of the cloud platform. Optionally, in a process that each VM joins service providing, a quantity of resources that can provide a service for the application is increasing, and performance of the system is becoming better, that is, a larger user access count can be satisfied. Optionally, the bumper may simultaneously adjust the size of the ISW to satisfy more user access requirements. Therefore, the bumper may gradually perform capacity expansion rhythmically rather than emergently perform capacity expansion when the system is going to crash. When the bumper emergently performs capacity expansion when the system is going to crash, a capacity expansion speed is slower than a concurrent pressure increase speed, and a newly added server immediately faces great access pressure and crashes at once. Therefore, according to the method for managing a resource on a cloud platform in this embodiment of this application, capacity expansion can be performed rhythmically while it is ensured that a system can provide a stable service, and in a capacity expansion process, a stable high-availability service can be provided by adjusting a size of an ISW. For example, in a gradual capacity expansion process, the health condition is quickly improved, and the size of the ISW may be increased, so as to ensure that more users can enjoy the service; or in a gradual capacity expansion process, if a user access count continuously surges, the size of the ISW may be reduced to relieve pressure caused by the user access count surge.

TABLE 1

| Health condition level | Health condition score | Resource adjustment policy |
| --- | --- | --- |
| Healthy | 71-100 | 0 |
| Sub-healthy | 66-70 | $M_1$ |
| Slightly-risky | 51-65 | $M_2$ |
| Highly-risky | 0-50 | $M_3$ |

It should be understood that, the correspondence between a health condition score and a health condition level shown in Table 1 is merely an example, and constitutes no limitation on this embodiment of this application. In this embodiment of this application, 81-100, 71-80, 61-70, and 0-60 may be used to respectively correspond to the four health condition levels: healthy, sub-healthy, slightly-risky, and highly-risky. In this embodiment of this application, 0-200, 0-10, or the like may be used to estimate the health condition of the cloud platform. It should be further understood that the health condition level of the cloud platform may be further divided into five levels, three levels, or the like in this embodiment of this application. The resource adjustment policy shown in Table 1 is merely an example. In specific application, a quantity of resources that need to be increased varies with an actual application scenario and a user requirement, and this is not limited in this embodiment of this application.

Therefore, according to the method for managing a resource on a cloud platform in this embodiment of this application, a quantity of resources allocated to an application and a size of an intelligent sliding window can be adjusted according to running status information of a cloud platform system, and therefore a user can be provided with a stable high-availability service.

Optionally, in an embodiment, the method 400 further includes:

determining that a current running status of the cloud platform is an emergency state according to a PV fluctuation ratio of the application and/or a quantity of remaining resources of the cloud platform;

determining an emergency plan that matches the current running status of the cloud platform from a plan library of the cloud platform; and adjusting, according to a solution of the emergency plan, the quantity of resources allocated to the application and the ISW.

Specifically, the bumper determines that the system is in an emergency state according to a current PV fluctuation ratio of the application and/or the quantity of remaining resources of the cloud platform system. For example, when the bumper determines, according to the current PV fluctuation ratio, that a quantity of resources that need to be added is far greater than the quantity of remaining resources of the cloud platform system, the bumper determines that the cloud platform system is in an emergency state, and requires emergent capacity expansion. Optionally, the bumper may search for an emergency plan that matches the current running status of the cloud platform system from the plan library. For example, the bumper may determine, according to factors such as a current user access count and a service type of the application, whether the current running status of the cloud platform system matches the emergency plan. Then, the bumper may manage, according to a solution of the emergency plan in the plan library, the quantity of resources allocated to the application and the size of the ISW. For example, if the solution of the emergency plan in the plan library is to add four VMs and adjust the size of the ISW to two times as much as an original size, the bumper may make corresponding adjustment to resources of the cloud platform system according to the solution.

Optionally, in an embodiment, the determining an emergency plan that matches the current running status of the cloud platform from a plan library of the cloud platform includes:

determining, according to at least one of a PV of the application, a service type of the application, the quantity of remaining resources of the cloud platform, or a response time of the application, that the current running status of the cloud platform matches the emergency plan.

Specifically, the bumper may determine, according to one or more of the PV of the application, the service type of the application, the quantity of remaining resources of the cloud platform system, or the response time of the application, that the current running status of the system matches a state of the emergency plan in the plan library. For example, when determining that service types of applications are consistent, and the PV of the application matches an access count of an application in the emergency plan, the bumper may determine that the running status of the cloud platform system matches the emergency plan; and determine that the solution of the emergency plan is a resource adjustment policy in the current running status of the system, and manage the resources of the system and the size of the ISW according to the solution.

Optionally, in another embodiment, the determining the resource adjustment policy of the health condition of the cloud platform according to the health condition of the cloud platform includes:

if the health condition of the cloud platform is less than a first health condition threshold and greater than a second health condition threshold, determining that the health condition of the cloud platform belongs to a first health condition level, where a resource adjustment policy corresponding to the first health condition level is to adjust the size of the intelligent sliding window ISW according to the health condition of the cloud platform;

if the health condition of the cloud platform is less than a second health condition threshold and greater than a third health condition threshold, determining that the health condition of the cloud platform belongs to a second health condition level, where a resource adjustment policy corresponding to the second health condition level is to make a resource adjustment suggestion according to the health condition of the cloud platform and send the resource adjustment suggestion to the flexible scaling system, so that the flexible scaling system adjusts, according to the resource adjustment suggestion, the quantity of resources allocated to the application; or if the health condition of the cloud platform is less than a third health condition threshold, determining that the health condition of the cloud platform belongs to a third health condition level, where a resource adjustment policy corresponding to the third health condition level is to determine a plan that matches the health condition of the cloud platform from the plan library of the system, and adjust, according to a solution used to deal with the plan, the quantity of resources allocated to the application; where the second health condition threshold is less than the first health condition threshold, and the third health condition threshold is less than the second health condition threshold.

Specifically, if the health condition of the cloud platform is less than the first health condition threshold and greater than the second health condition threshold, it is determined that the health condition of the cloud platform belongs to the first health condition level. Optionally, if the health condition of the cloud platform is divided into four health condition levels: healthy, sub-healthy, slightly-risky, and highly-risky, in this case, it may be considered that the health condition of the cloud platform is at the sub-healthy level. If the health condition of the cloud platform is graded by 100 scores, the first health condition threshold may be 70, and the second health condition threshold may be 65. In this state, although the system can provide a high-performance service in a period of time, if the PV continuously increases, system performance may be insufficient. Optionally, by adjusting the size of the ISW, the bumper may relieve impact caused by an access request surge. For example, the bumper may adjust a current ISW to be smaller, that is, reduce an allowed maximum user access count of the system in a unit time. That is, if performance of the system is not extremely poor, the size of the ISW may be adjusted to improve the performance of the system in this case; or the bumper may further send health condition information of the cloud platform to the flexible scaling system, and then the flexible scaling system may make a corresponding resource adjustment solution according to the health condition information of the cloud platform, so as to adjust the quantity of resources allocated to the application. For example, the flexible scaling system may determine to add one VM according to the health condition information, so as to deal with a current condition of the system.

If the health condition of the cloud platform is less than the second health condition threshold and greater than the third health condition threshold, it is determined that the health condition of the cloud platform belongs to the second health condition level. Optionally, if the health condition of the cloud platform is divided into four health condition levels: healthy, sub-healthy, slightly-risky, and highly-risky, in this case, it may be considered that the health condition level of the cloud platform is the slightly-risky level. If the health condition of the cloud platform is graded by 100 scores, the second health condition threshold may be 65, and the third health condition threshold may be 50. In this case, optionally, the bumper may send the health condition information of the cloud platform to the flexible scaling system, and then the flexible scaling system may make a corresponding resource adjustment solution according to the health condition information of the cloud platform, so as to adjust the quantity of resources allocated to the application. For example, according to the current health condition information of the cloud platform, the flexible scaling system determines to add one VM; or the bumper may compare the health condition information of the cloud platform with information, such as health condition information or a service type of a case in the plan library, so as to determine a plan that matches the current state of the system, and then use a solution of the plan as a resource adjustment policy to adjust the quantity of resources allocated to the application. That is, if the running status of the system has a risk of becoming worse, and high performance of the system cannot be sustained by adjusting the size of the ISW, in this case, a solution of increasing the quantity of resources allocated to the application and adjusting the size of the ISW may be used to ensure high performance of the system. An added quantity may be determined according to the health condition of the cloud platform, and the quantity of resources allocated to the application is not always increased without a good reason. If the quantity of resources allocated to the application is always increased without a good reason, some system resources are idle, and a user further needs to pay a lot of fees for the added system resources. Therefore, in the method for managing a resource on a cloud platform in this embodiment of this application, system resource utilization is also improved.

If the health condition of the cloud platform is less than the third health condition threshold, it is determined that the health condition of the cloud platform belongs to the third health condition level. Optionally, if the health condition of the cloud platform is divided into four health condition levels: healthy, sub-healthy, slightly-risky, and highly-risky, in this case, it may be considered that the health condition of the cloud platform is at the highly-risky level. If the health condition of the cloud platform is graded by 100 scores, the third health condition threshold may be 50. In this case, optionally, the bumper may compare the health condition information of the cloud platform with health condition information of a case in the plan library, so as to determine a plan that matches the current running status of the system, and then use a solution of the plan as a resource adjustment policy to adjust the quantity of resources allocated to the application. Optionally, the bumper may send the resource adjustment policy to the flexible scaling system by using an emergency channel, and the flexible scaling system may perform emergent capacity expansion according to the resource adjustment policy.

It should be understood that solutions such as adjusting the size of the ISW and increasing a quantity of VMs are not isolated, and may be combined for execution. For example, the quantity of VMs may be increased first, and then the size of the ISW is adjusted; or the quantity of VMs is increased and the size of the ISW is adjusted at the same time; or the size of the ISW is adjusted first, and then the quantity of VMs is increased. This is not limited in this embodiment of this application.

It should be further understood that, the foregoing examples merely represent three possible implementations, but are not construed as a limitation on a condition for executing the foregoing three implementations. For example, when the health condition is less than the first health condition threshold and greater than the second health condition threshold, the quantity of resources allocated to the application and the size of the ISW may be adjusted by matching an emergency plan in the plan library. In addition, that a higher health condition indicates better performance is merely used as an example, and sets no limitation in this embodiment of this application. Alternatively, it may be set that a higher health condition indicates worse system performance, that is, the health condition may be inversely proportional to the system performance. It should be further noted that, the health condition thresholds in the foregoing embodiment are merely examples and set no limitation, and values of the thresholds may vary with actual application scenarios or requirements.

Optionally, in an embodiment, the first status information of the cloud platform may include at least one of the following items:

a PV fluctuation ratio of the application, the quantity of remaining resources of the cloud platform, an average response time of the application, or a service health coefficient β of the application, where β is a performance indicator of the cloud platform that is fed back by the flexible scaling system.

Because the health condition of the cloud platform is determined according to the first status information of the system, the health condition of the cloud platform may be determined according to at least one of the following items: the PV fluctuation ratio of the application, the quantity of remaining resources of the cloud platform, the average response time of the application, or the service health coefficient β of the application, where β is a performance indicator of the system that is fed back by the flexible scaling system.

For example, the health condition of the cloud platform may be represented by $°H$, and $°H$ may be determined according to the following formula:

$$°H = SUM(o \times (1 - W_{cur}),$$

$$p \times C_{total}(1-(C_{Used}+C_{Increasing})/C_{total}),$$

$$q=((RT_{avg}-RT_{std})/RT_{avg}),$$

$$r \times \beta)$$

where o, p, q, and r are all greater than or equal to 0 and less than 1. SUM(o, p, q, r)=1, and SUM represents summation, that is, a sum of o, p, q, and r is 1. $W_{cur}$ represents a PV fluctuation ratio of the application in a current period of time, $C_{total}$ is a total quantity of resources of the cloud platform, $C_{Used}$ is a quantity of used resources, $C_{Increasing}$ is a quantity of resources that need to be increased in a next period of time, $RT_{avg}$ is an average response time of the application, and $RT_{std}$ is a maximum response time of the application. β includes other factors, such as an App system and a central processing unit (CPU), a memory, and a disk that are of a server on which the App system is deployed and that affect system capacity expansion, and the indicator is mainly obtained from a flexible scaling monitor system or another similar system.

Specifically, if o=60%, p=30%, q=10%, and r=0, the health condition of the cloud platform may be determined according to the following formula:

$$°H = SUM(60\% \times (1-W_{cur}),$$

$$30\% \times C_{total}(1-(C_{Used}+C_{Increasing})/C_{total}),$$

$$10\% \times ((RT_{avg}-RT_{std})/RT_{avg}))$$

If $RT_{avg}-RT_{std}<0$, the item is 0, $°H \in [0, 100]$, and when $°H$ is less than 0, a value of $°H$ is 0.

The health condition is determined according to a 631 rule in this embodiment of this application. That is, a weight of a PV fluctuation ratio of the App in a current period of time is 6, a weight of the quantity of remaining resources of the cloud platform is 3, and a weight of the average response time of the App is 1. It should be noted that the 631 rule used to determine the health condition is merely used as an example for description in this embodiment of this application, and shall not constitute any limitation on this embodiment of this application. An 811 rule or the like may be used in this embodiment of this application, and this is not limited in this embodiment of this application.

Optionally, in an embodiment, the PV fluctuation ratio $W_{cur}$ of the App in a current period of time may be determined according to the following formula (1):

$$W_{cur}=(PV_{cur}-PV_{prev})/\max(PV_{cur},PV_{prev}) \quad (1)$$

where $PV_{cur}$ is a PV of the application in a current period of time, and $PV_{prev}$ is a PV of the application in a previous period of time.

Optionally, in an embodiment, an average PV fluctuation ratio $W_{avg}$ of the App in a unit period of time may be determined according to the following formula (2):

$$W_{avg}=Avg(W_1, W_2, \ldots, W_n) \quad (2)$$

where $W_1, W_2, \ldots, W_n$ are PV fluctuation quantities in n periods of time, and Avg represents that an average value is to be obtained.

Optionally, in an embodiment, a PV in a next period of time may be predicted according to the following formula (3):

$$PV_{next}=Sum(50\% \times |PV_{cur}|, 10\% \times |PV_{prev1}|, 10\% \times |PV_{prev2}|, 10\% \times |PV_{prev3}|, 10\% \times |PV_{prev4}|, 10\% \times |PV_{prev5}|) \quad (3)$$

where $PV_{next}$ is the PV in the next period of time, and $|PV_{prev1}|$, $|PV_{prev2}|$, $|PV_{prev3}|$, $|PV_{prev4}|$, and $|PV_{prev5}|$ are absolute values of PVs of the application in five periods of time prior to the current period of time.

A 515 rule is used in this embodiment of this application to predict $PV_{next}$. That is, PV data of six sampling points is collected, a weight of the first five sampling points is set to 1, and a weight of a latest sampling point, that is, a current sampling point is set to 5. It should be noted that the 515 rule used to predict $PV_{next}$ is merely used as an example for description in this embodiment of this application, and shall not constitute any limitation on this embodiment of this application. An 811 rule may be used in this embodiment of this application, that is, data of three points is collected, a weight of the first two points is 1, and a weight of a latest sampling point is 8. This is not limited in this embodiment of this application.

Optionally, in an embodiment, a PV increasing quantity $PV_{increasing}$ the App in a increasing of future period of time is determined according to the following formula (4):

$$PV_{increasing}=(W_{avg} \times PV_{next}) \times T_{run} \quad (4)$$

where $W_{avg}$ is an average PV fluctuation ratio of the App in a unit period of time, and $T_{run}$ is a time of a server from starting to serving.

Optionally, in an embodiment, an average response time $RT_{avg}$ of the App in the unit period of time may be determined according to the following formula (5):

$$RT_{avg}=Sum(80\% \times RT_{cur}, 10\% \times RT_{prev1}, 10\% \times RT_{prev2}) \quad (5)$$

where $RT_{cur}$ represents a response time of the App in a current period of time, and $RT_{prev1}$ and $RT_{prev2}$ represent response times of the App in two periods of time prior to the current period of time.

The 811 rule is used in this embodiment of this application to determine $RT_{avg}$. That is, RT data of three sampling points is collected, a weight of the first two sampling points is set to 1, and a weight of a latest sampling point, that is, a current sampling point is set to 8. It should be noted that the 811 rule used to determine $RT_{avg}$ is merely used as an example for description in this embodiment of this application, and shall not constitute any limitation on this embodiment of this application. A 515 rule may be used in this embodiment of the this application, that is, data of six points is collected, a weight of the first five sampling points is 1, and a weight of a latest sampling point is 5. This is not limited in this embodiment of this application.

Figure 5:
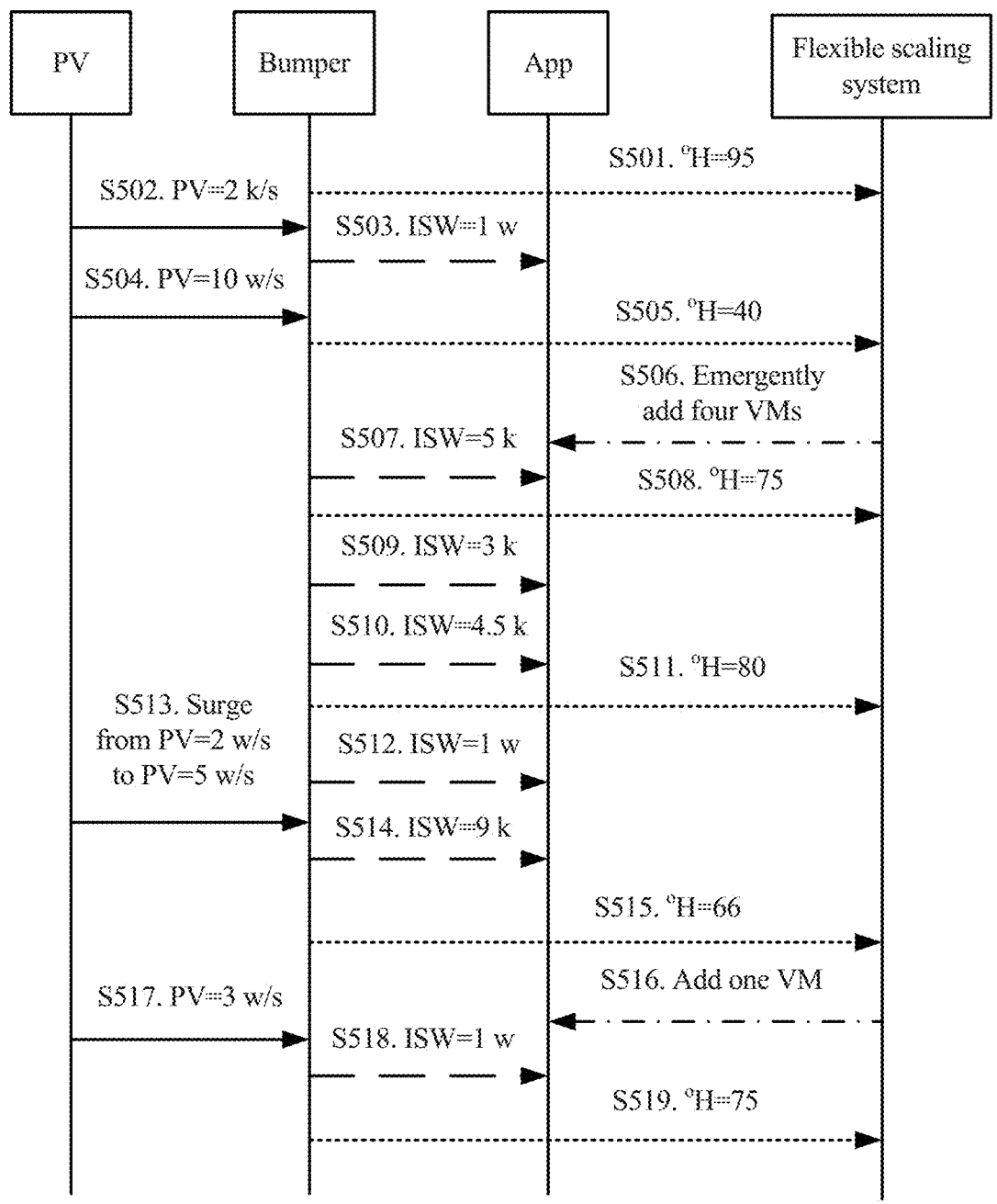
FIG. 5 is a schematic flowchart of a method for managing a resource on a cloud platform according to another embodiment of this application.

FIG. 5 shows a schematic diagram of a method 500 for managing a resource on a cloud platform according to a specific embodiment of this application. The method 500 may be executed by means of cooperation of modules shown in FIG. 6.

Figure 6:
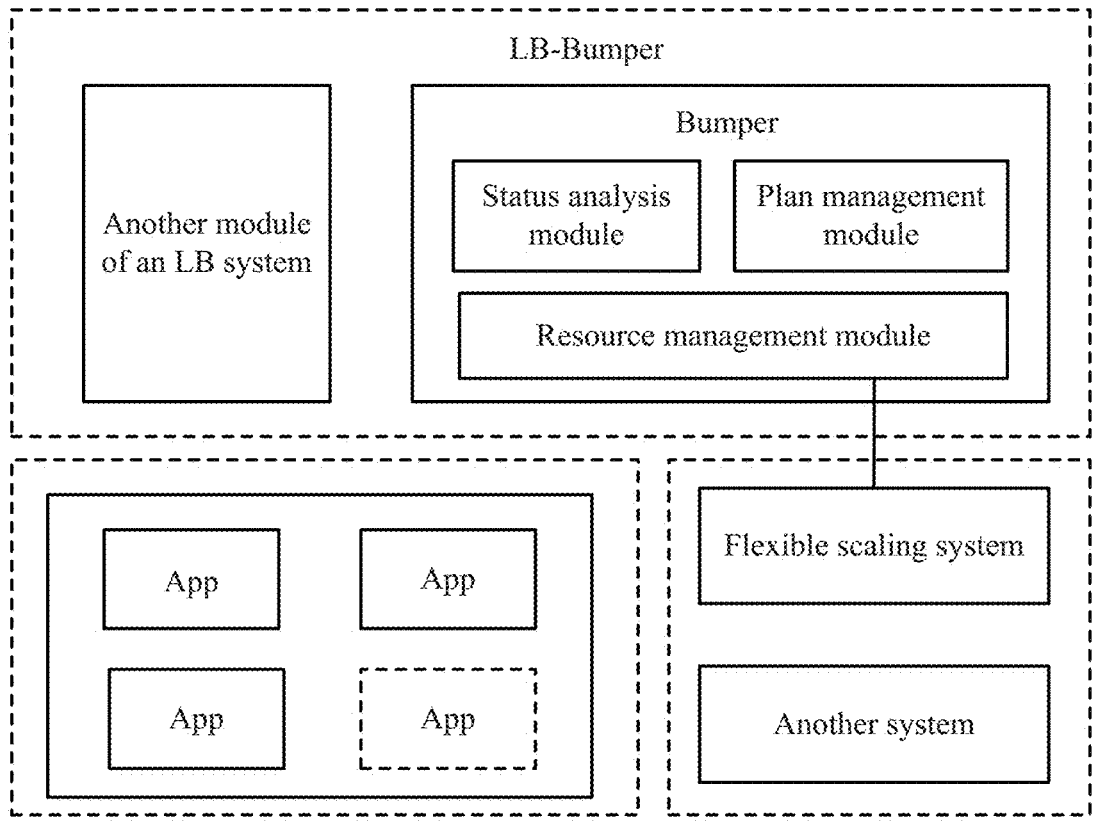
FIG. 6 is a logic diagram of an apparatus for managing a resource on a cloud platform according to an embodiment of this application.

FIG. 6 shows an implementation solution of a brief LB-Bumper. The LB-Bumper may work as a module of an LB system, or connect to a flexible scaling system and send health condition data to the flexible scaling system, so that the flexible scaling system makes a capacity expansion or reduction decision. Optionally, the LB-Bumper may connect to the flexible scaling system by using a Keep-alive link. For example, if a health condition of the cloud platform is at a sub-healthy level, the LB-Bumper may communicate with the flexible scaling system by using a common channel. In an emergency case, the LB-Bumper may communicate with the flexible scaling system by using an emergency channel.

With reference to a specific embodiment shown in FIG. 5, the following describes in detail the method for managing a resource on a cloud platform according to this embodiment of this application. In this embodiment, it is set that capacity expansion stops when the health condition of the cloud platform reaches 75.

S501. A PV is relatively low in this case, and a bumper determines that the health condition of the cloud platform is 95 according to a current PV condition of an application, and determines that a running status of a system is good. Optionally, in this case, the bumper communicates with the flexible scaling system by using a common channel.

S502. A user starts to access the application, but the PV is relatively low (2000/s) at this moment, that is, a user access count in is 1s two thousand.

S503. The bumper determines a current health condition of the cloud platform and a size of an ISW according to the current PV condition, and determines that a current health condition of the system is good according to an analysis result. A current size of the ISW is 10000, that is, a current allowed user access count at a time is 10 thousand.

S504. After a period of time of running, the PV surges from 2000/s to 100000/s, and the bumper determines, according to a PV fluctuation ratio of the application, that the state may last for a period of time.

S505. The bumper determines that a current health condition score of the cloud platform is 40 according to the PV fluctuation ratio of the application, and the system is in a highly-risky state in this case. Optionally, the bumper searches for an emergency plan that matches the current running status of the system from a plan library and uses a solution of the emergency plan as a solution in the current running status of the system. For example, the solution is to emergently add four VMs. Optionally, the bumper may notify the flexible scaling system of the solution by using an emergency channel.

S506. The flexible scaling system emergently adds four VMs according to the solution.

In S507, S509, S510, and S512, the four VMs are added one by one to provide a service. As the four VMs are added one by one to provide a service, performance of the system becomes better. Optionally, in a process that the four VMs are added one by one to provide a service, the bumper may adjust the size of the ISW according to an actual running status of the system (for example, 10,000/s→5000/s→3000/s→4500/s→10,000/s).

S508. After a period of time of processing, the health condition of the cloud platform becomes 75, and the performance of the system becomes good. In S411, the PV keeps at 20000/s, and the health condition of the cloud platform reaches 80, that is, the health condition is greater than 75, and there is no need to perform capacity expansion.

S513. At a subsequent time point, the PV surges from 20000/s to 50000/s.

S514. The bumper determines, according to a current running status of the system, that in a next period of time, the system may have a risk of being overloaded or performance deterioration.

S515. The bumper sends current health condition information to the flexible scaling system. Because the running status of the system at this moment is not extremely poor, the bumper may send the health condition information to the flexible scaling system by using a common channel.

S516. The flexible scaling system determines, according to the health condition information, to add one VM.

S517. After a period of time after one VM is added, the PV keeps at 30,000/s.

S518. The bumper adjusts the ISW to 10,000/s according to the running status of the system.

S519. The health condition of the cloud platform is 75, and capacity expansion stops.

The foregoing example mainly includes an implementation of the method for managing a resource on a cloud platform in two scenarios (one is a scenario in which the PV surges, and the other is a scenario in which the PV increases slightly). When the PV surges, the bumper may instruct, by matching an emergency plan, the flexible scaling system to perform emergent capacity expansion, and may continuously adjust the size of the ISW in an emergent capacity expansion process to relieve impact to the system caused by a PV surge. When a PV increase is not extremely large, the bumper may determine a quantity of to-be-added servers or VMs according to the health condition information of the cloud platform, or push the health condition information of the cloud platform to the flexible scaling system, so that the flexible scaling system determines a capacity expansion policy according to the health condition information, and the size of the ISW can be adjusted according to a real-time running status of the system when capacity expansion is performed.

Therefore, according to the method for managing a resource on a cloud platform in this embodiment of this application, a quantity of resources allocated to an application and a size of an intelligent sliding window can be adjusted according to running status information of a cloud platform system. Therefore, when a user access count surges, it can be ensured that a stable high-availability service can be provided by adjusting the size of the ISW while capacity expansion is implemented.

Figure 7:
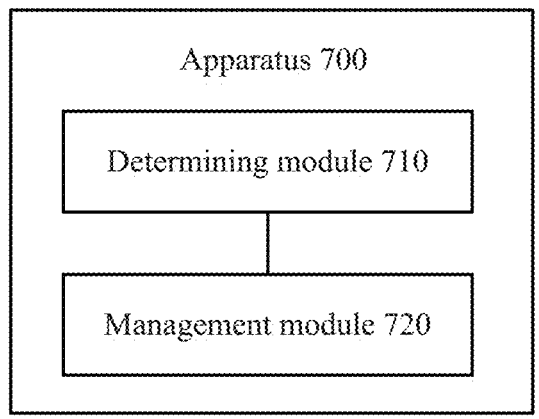
FIG. 7 is a schematic block diagram of an apparatus for managing a resource on a cloud platform according to an embodiment of this application.

FIG. 7 shows a schematic block diagram of an apparatus 700 for managing a resource on a cloud platform according to an embodiment of this application. As shown in FIG. 7, the apparatus 700 includes:

a determining module 710, configured to determine a resource adjustment policy according to first status information of the cloud platform, where the resource adjustment policy is used to adjust a quantity of resources allocated to an application; where the determining module 710 is further configured to determine a size of an intelligent sliding window ISW according to second status information of the cloud platform, where the ISW is used to indicate an allowed maximum page view PV of the application in a unit time, and the first status information and the second status information indicate running statuses of the cloud platform when the cloud platform provides a service for the application; and a management module 720, configured to adjust, according to the resource adjustment policy, the quantity of resources allocated to the application, and adjust the ISW according to the determined size of the ISW.

Specifically, a function of the determining module 710 is the same as that of the status analysis module 310 in FIG. 3, and the function of the determining module 710 may be implemented by using a software program. For example, the software program may be implemented in a process, may be implemented by using a software module in a hardware chip, or may be implemented by a combination of hardware and software modules. Optionally, the determining module 710 may be integrated into an LB system or a flexible scaling system, may be an independent module, or the like. Optionally, in a Paas cloud platform, one determining module 710 may be configured for each application, that is, the determining module 710 may be on a per-application basis; or several applications share one determining module 710. This is not limited in this embodiment of this application. A function of the management module 720 is the same as that of the plan management module 320 and that of the resource management module 330 in FIG. 3, and the function of the management module 720 may be implemented by using a software program. For example, the software program may be implemented in a process, may be implemented by using a software module in a hardware chip, or may be implemented by a combination of hardware and software modules. Optionally, the management module 720 may be integrated into the LB system or the flexible scaling system to push a resource adjustment policy to the LB system or the flexible scaling system, may be an independent module, or the like. Optionally, on the Paas cloud platform, one management module 720 may be configured for each application, that is, the management module 720 may be on a per-application basis; or several applications share one management module 720. This is not limited in this embodiment of this application.

Therefore, the apparatus for managing a resource on a cloud platform in this embodiment of this application can adjust, according to running status information of a system, a quantity of resources that provide a service for an application and a size of an intelligent sliding window. Therefore, when a user access count surges, it can be ensured that a stable high-availability service can be provided by adjusting the size of the ISW while capacity expansion is implemented.

The apparatus 700 for managing a resource on a cloud platform according to this embodiment of this application may be corresponding to the bumper in the method 400 for managing a resource on a cloud platform according to the embodiment of this application. The foregoing and another operation and/or functions of modules in the apparatus 700 are separately intended to implement processes corresponding to the foregoing methods. For brevity, details are not described herein.

Figure 8:
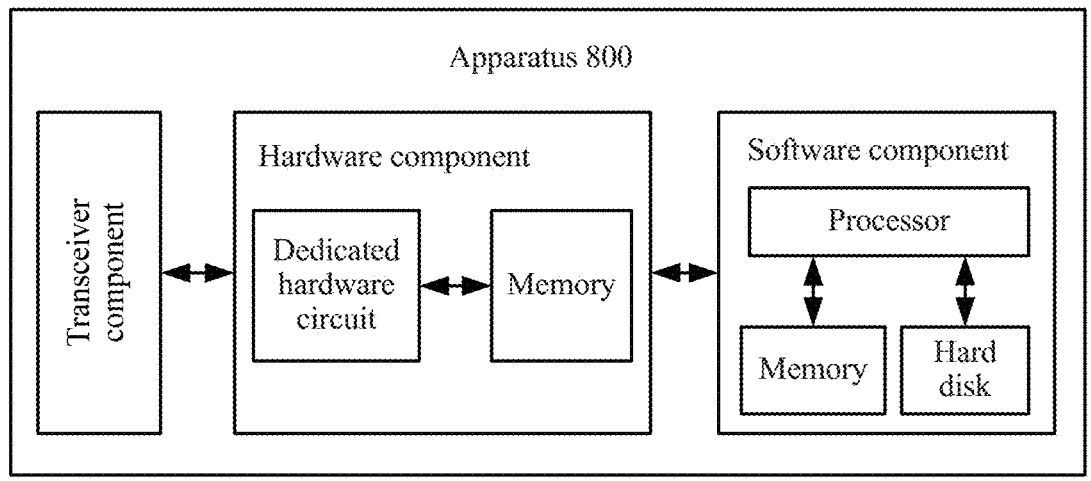
FIG. 8 is a schematic block diagram of an apparatus for managing a resource on a cloud platform according to another embodiment of this application.

As shown in FIG. 8, an embodiment of this application further provides a schematic block diagram of an apparatus 800 for managing a resource on a cloud platform. The apparatus 800 includes:

a transceiver component, a software component, and a hardware component.

The transceiver component is a hardware circuit configured to complete transceiving packet.

The hardware component may be referred to as a "hardware processing module", or be simply referred to as "hardware". The hardware component mainly includes a hardware circuit that implements some specific functions on the basis of dedicated hardware circuits such as an FPGA and an ASIC (probably with cooperation from another accessory component such as a memory). Generally, a processing speed of the hardware component is much faster than that of a general-purpose processor. However, a function of the hardware component is difficult to change once the function is customized, and therefore, the hardware component is not flexible during implementation and is usually configured to process some fixed functions. It should be noted that, in actual application, the hardware component may further include a processor such as a micro control unit (MCU, such as a single-chip microcomputer) or a CPU. However, a main function of these processors is not to complete big data processing but to perform some control. In this application scenario, a system including these components is referred to as a hardware component.

The software component (or simply referred to as "software") mainly includes a general-purpose processor (such as a CPU) and some accessory components (for example, storage devices such as a memory or a hard disk). The processor may be equipped with a corresponding processing function by means of programming, and when the software is used to implement a function, the software component may be flexibly configured according to a service requirement, but a speed of the software component is slower than that of the hardware component. After data is processed by the software, the hardware component may send the processed data by using the transceiver component, or send the processed data to the transceiver component by using an interface connected to the transceiver component.

In this embodiment of this application, the software component or the hardware component is configured to determine a resource adjustment policy and a size of an ISW, and adjust a quantity of resources allocated to an application and the ISW, which are mentioned in the foregoing embodiment.

In the method of combining software and hardware in this embodiment, not only the processing speed is ensured, but also flexibility is provided.

Therefore, the apparatus for managing a resource on a cloud platform in this embodiment of this application can adjust a quantity of resources allocated to an application and a size of an intelligent sliding window according to running status information of a cloud platform system. Therefore, when a user access count surges, it can be ensured that a stable high-availability service can be provided by adjusting the size of the ISW while capacity expansion is implemented.

The apparatus 800 for managing a resource on a cloud platform according to this embodiment of this application may be corresponding to the bumper in the method 400 for managing a resource on a cloud platform according to the embodiment of this application. The foregoing and another operation and/or functions of modules in the apparatus 800 are separately intended to implement processes corresponding to the foregoing methods. For brevity, details are not described herein.

Figure 9:
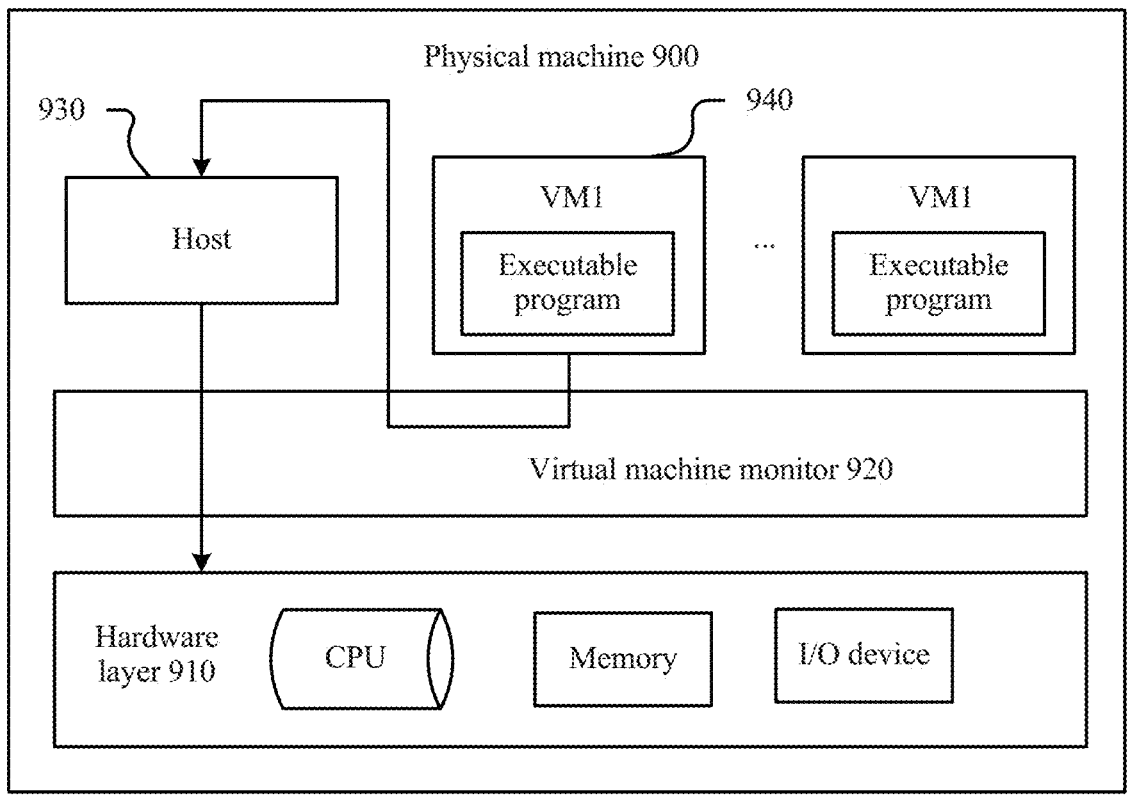
FIG. 9 is a schematic block diagram of an apparatus for managing a resource on a cloud platform according to still another embodiment of this application.

It should be noted that, the apparatus for managing a resource on a cloud platform provided in this embodiment of this application may be a cloud host in a cloud computing system, and the cloud host may be a virtual machine running on a physical machine. As shown in FIG. 9, a physical machine 900 includes a hardware layer 910, a virtual machine monitor (VMM) 920 running on the hardware layer 910, and a host 901 and several virtual machines (VM) running on the VMM 920. The hardware layer includes but is not limited to an I/O device, a CPU, and a memory. The apparatus for managing a resource on a cloud platform provided in this embodiment of this application may be a virtual machine in the physical machine 900, for example, a VM 940. One or more cloud applications are running on the VM 940. Each cloud application, such as a database application or a map application, is used to implement a corresponding service function, and these cloud applications may be developed by a developer and deployed in the cloud computing system. In addition, an executable program further runs on the VM 940. The VM 940 runs the executable program and invokes, in a running process of the program, a hardware resource of the hardware layer 910 by using the host 930, so as to implement functions of a determining module and a management module of the apparatus for managing a resource on a cloud platform. Specifically, the determining module and the management module may be included in the foregoing executable program in a manner of a software module or a function. For example, the executable program may include: the determining module and the management module. The VM 940 invokes resources such as a CPU and a memory at the hardware layer 910 to run the executable program, so as to implement the functions of the determining module and the management module. For brevity, details are not described herein.

Figure 10:
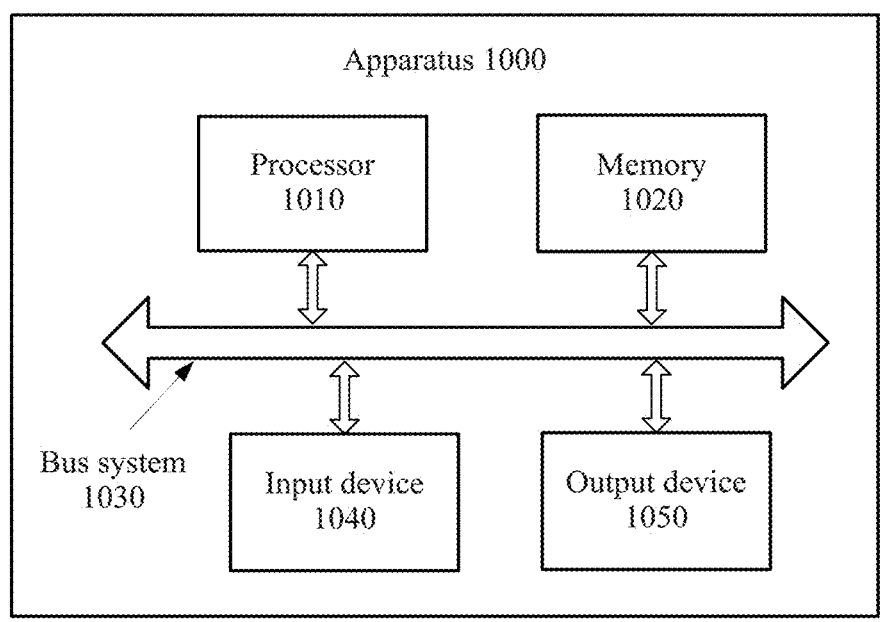
FIG. 10 is a schematic block diagram of an apparatus for managing a resource on a cloud platform according to yet another embodiment of this application.

As shown in FIG. 10, an embodiment of this application further provides a schematic block diagram of an apparatus 1000 for managing a resource. The apparatus 1000 for managing a resource includes a processor 1010, a memory 1020, a bus system 1030, an input device 1040, and an output device 1050.

The memory 1020 may include a read-only memory and a random access memory, and provide an instruction and data for the processor 1010. A part of the memory 1020 may further include a nonvolatile random access memory (NVRAM).

The memory 1020 stores the following elements: an executable module or data structure, a subset of an executable module or data structure, or an extended set of an executable module or data structure:

operation instructions, including various operation instructions, used to implement various operations; and an operating system, including various system programs, used to implement various basic services and process hardware-based tasks.

In this embodiment of this application, the processor 1010 executes the following operations by invoking an operation instruction stored in the memory 1020 (the operation instruction may be stored in the operating system):

determining a resource adjustment policy according to first status information of a cloud platform, where the resource adjustment policy is used to adjust a quantity of resources allocated to the application; determining a size of an intelligent sliding window ISW according to second status information of the cloud platform, where the ISW is used to indicate an allowed maximum page view PV of the application in a unit time, and the first status information and the second status information indicate running statuses of the cloud platform when the cloud platform provides a service for the application; and adjusting, according to the resource adjustment policy, the quantity of resources allocated to the application, and adjusting the ISW according to the determined size of the ISW.

The processor 1010 controls an operation of the apparatus 1000, and the processor 1010 may be further referred to as a central processing unit (CPU). The memory 1020 may include a read-only memory and a random access memory, and provide an instruction and data for the processor 1010. A part of the memory 1020 may further include a nonvolatile random access memory (NVRAM). In specific application, all components of the apparatus 1000 are coupled together by using the bus system 1030. The bus system 1030 may include a power supply bus, a control bus, a status signal bus, and the like in addition to a data bus. However, for clarity of description, various buses are marked as the bus system 1030 in the figure. For ease of denotation, the various buses are indicated by using only one bold line in FIG. 10; however, it does not mean that the bus system 1030 has only one bus or one type of bus.

The methods disclosed in the foregoing embodiments of this application may be applied to the processor 1010, or implemented by the processor 1010. The processor 1010 may be an integrated circuit chip and has a signal processing capability. In an implementation process, each step in the foregoing method may be completed by using an integrated logic circuit of hardware or an instruction in a form of software in the processor 1010. The processor 1010 may be a general-purpose processor, a digital signal processor (DSP), an application-specific integrated circuit (ASIC), a field programmable gate array (FPGA) or another programmable logic device, a discrete gate or transistor logic device, or a discrete hardware assembly; and may implement or execute methods, steps, and logical block diagrams disclosed in the embodiments of this application. The general-purpose processor may be a microprocessor or the processor may be any conventional processor, or the like. Steps of the methods disclosed with reference to the embodiments of this application may be directly executed and completed by using a hardware decoding processor, or may be executed and completed by using a combination of hardware and software modules in a decoding processor. The software module may be located in a mature storage medium in the field, such as a random access memory, a flash memory, a read-only memory, a programmable read-only memory, an electrically-erasable programmable memory, or a register. The storage medium is located in the memory 1020. The processor 1010 reads information in the memory 1020, and completes the steps of the foregoing method in combination with hardware of the processor 1010.

Therefore, the apparatus for managing a resource on a cloud platform in this embodiment of this application can adjust, according to running status information of a system, a quantity of resources that provide a service for an application and a size of an intelligent sliding window. Therefore, when a user access count surges, it can be ensured that a stable high-availability service can be provided by adjusting the size of the ISW while capacity expansion is implemented.

The apparatus 1000 for managing a resource on a cloud platform according to this embodiment of this application may be corresponding to the bumper in the method 400 for managing a resource on a cloud platform according to the embodiment of this application. The foregoing and another operation and/or functions of modules in the apparatus 1000 are separately intended to implement processes corresponding to the foregoing methods. For brevity, details are not described herein.

It should be understood that a term "and/or" in this specification is merely an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, multiple units or components may be combined or integrated into another system, or some features may be ignored or not performed. In addition, the displayed or discussed mutual couplings or direct couplings or communications connections may be implemented by using some interfaces. The indirect couplings or communications connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method comprising:
   determining a resource adjustment policy according to first status information of a cloud platform, wherein the resource adjustment policy adjusts a quantity of resources allocated to an application deployed on the cloud platform;
   determining a size of an intelligent sliding window (ISW) according to second status information of the cloud platform, wherein the size of the ISW indicates an allowed maximum page view (PV) of the application in a unit time, and the first status information and the second status information indicate running statuses of the cloud platform when the cloud platform provides a service for the application; and
   adjusting, according to the resource adjustment policy, the quantity of resources allocated to the application and the size of the ISW,
   wherein the second status information of the cloud platform comprises at least one of the following items:
     an allowed maximum PV of the application in a unit time,
     the quantity of remaining resources of the cloud platform, and
     a period of time from a moment when a server that provides a service for the application is started to a moment when the server is loaded to provide a service for the application.

2. The method according to claim 1, wherein the determining the resource adjustment policy according to the first status information of the cloud platform comprises:
   determining a health condition of the cloud platform according to the first status information, wherein the health condition of the cloud platform indicates a performance of the cloud platform when the cloud platform provides a service for the application; and
   determining the resource adjustment policy according to the health condition of the cloud platform.

3. The method according to claim 2, wherein the determining the resource adjustment policy according to the health condition of the cloud platform comprises:
   determining a health condition level corresponding to the health condition of the cloud platform from multiple health condition levels; and
   determining a resource adjustment policy corresponding to the health condition level according to a correspondence between multiple resource adjustment policies and the multiple health condition levels, wherein the correspondence is preconfigured on the cloud platform.

4. The method according to claim 1, further comprising:
   determining that a current running status of the cloud platform is an emergency state according to at least one of: (a) a PV fluctuation ratio of the application and (b) a quantity of remaining resources of the cloud platform;

determining an emergency plan that matches the current running status of the cloud platform from a plan library of the cloud platform; and adjusting, according to the emergency plan, the quantity of resources allocated to the application and the ISW.

5. The method according to claim 4, wherein the determining the emergency plan that matches the current running status of the cloud platform in the plan library of the cloud platform comprises:

determining, that the current running status of the cloud platform matches the emergency plan, according to at least one of:
a PV of the application,
a service type of the application,
the quantity of remaining resources of the cloud platform, and
a response time of the application.

6. The method according to claim 1, wherein the first status information of the cloud platform comprises at least one of the following items:
a PV fluctuation ratio of the application,
the quantity of remaining resources of the cloud platform,
an average response time of the application, and
a service health coefficient β of the application, wherein β is a performance indicator of the cloud platform that is fed back by a flexible scaling system.

7. A physical machine, comprising: a hardware layer, a virtual machine monitor (VMM) running on the hardware layer, and a virtual machine (VM) running on the VMM, wherein an application is running on the VM, and the VM runs an executable program using hardware resources of the hardware layer, which cause the VM to:

determine a resource adjustment policy according to first status information of the physical machine, wherein the resource adjustment policy adjusts a quantity of resources allocated to the application;

determine a size of an intelligent sliding window (ISW) according to second status information of the physical machine, wherein the size of the ISW indicates an allowed maximum page view (PV) of the application in a unit time, and the first status information and the second status information indicate running statuses of the physical machine when the physical machine provides a service for the application; and adjusting, according to the resource adjustment policy, the quantity of resources allocated to the application and the size of the ISW, wherein the second status information comprises at least one of the following items:
an allowed maximum PV of the application in a unit time,
the quantity of remaining resources of the physical machine, and
a period of time from a moment when the VM is started to a moment when the VM is loaded to provide a service for the application.

8. The physical machine according to claim 7, wherein the VM is further configured to:

determine a health condition of the physical machine according to the first status information, wherein the health condition indicates a performance of the physical machine when the physical machine provides a service for the application; and determine the resource adjustment policy according to the health condition.

9. The physical machine according to claim 8, wherein the VM is further configured to:

determine a health condition level corresponding to the health condition from multiple health condition levels; and determine a resource adjustment policy corresponding to the health condition level according to a correspondence between multiple resource adjustment policies and the multiple health condition levels, wherein the correspondence is preconfigured.

10. The physical machine according to claim 7, wherein the VM is further configured to:

determine that a current running status of the physical machine is an emergency state according to at least one of: (a) a PV fluctuation ratio of the application and (b) a quantity of remaining resources of the physical machine;

determine an emergency plan that matches the current running status from a plan library; and adjust, according to the emergency plan, the quantity of resources allocated to the application and the ISW.

11. The physical machine according to claim 10, wherein the VM is further configured to:

determine, that the current running status matches the emergency plan, according to at least one of:
a PV of the application,
a service type of the application,
the quantity of remaining resources of the cloud platform, and
a response time of the application.

12. The physical machine according to claim 7,
wherein the first status information comprises at least one of the following items:
a PV fluctuation ratio of the application,
the quantity of remaining resources of the physical machine,
an average response time of the application, and
a service health coefficient β of the application, wherein β is a performance indicator of the physical machine that is fed back by a flexible scaling system.

13. An apparatus for managing a resource,
comprising: a processor and a memory, wherein the memory stores instructions that, when executed by the processor, cause the processor to perform operations including:

determining a resource adjustment policy according to first status information of a cloud platform on which an application is deployed, wherein the resource adjustment policy adjusts a quantity of resources allocated to the application;

determining a size of an intelligent sliding window (ISW) according to second status information of the cloud platform, wherein the size of the ISW indicates an allowed maximum page view (PV) of the application in a unit time, and the first status information and the second status information indicate running statuses of the cloud platform when the cloud platform provides a service for the application; and adjusting, according to the resource adjustment policy, the quantity of resources allocated to the application and the size of the ISW according to the determined size of the ISW, wherein the second status information comprises at least one of the following items:
an allowed maximum PV of the application in a unit time,
the quantity of remaining resources of the cloud platform, and a period of time from a moment when a server that provides a service for the application is started to a moment when the server is loaded to provide a service for the application.

14. The apparatus for managing a resource according to claim 13, wherein the processor is configured to:
determine a health condition of the cloud platform according to the first status information, wherein the health condition indicates a performance of the cloud platform when the cloud platform provides a service for the application; and
determine the resource adjustment policy according to the health condition.

15. The apparatus for managing a resource according to claim 14, wherein the processor is configured to:
determine a health condition level corresponding to the health condition from multiple health condition levels; and
determine a resource adjustment policy corresponding to the health condition level according to a correspondence between multiple resource adjustment policies and the multiple health condition levels, wherein the correspondence is preconfigured.

16. The apparatus for managing a resource according to claim 13, wherein the processor is further configured to:
determine that a current running status of the cloud platform is an emergency state according to at least one of: (a) a PV fluctuation ratio of the application and (b) a quantity of remaining resources of the cloud platform;
determine an emergency plan that matches the current running status from a plan library; and
adjust, according to the emergency plan, the quantity of resources allocated to the application and the ISW.

17. The apparatus for managing a resource according to claim 16, wherein the processor is configured to:
determine, that the current running status matches the emergency plan, according to at least one of:
a PV of the application,
a service type of the application,
the quantity of remaining resources of the cloud platform, and
a response time of the application.

18. The apparatus for managing a resource according to claim 15, wherein the first status information comprises at least one of the following items:
a PV fluctuation ratio of the application,
the quantity of remaining resources of the cloud platform,
an average response time of the application, and
a service health coefficient $\beta$ of the application, wherein $\beta$ is a performance indicator of the cloud platform that is fed back by a flexible scaling system.

* * * * *